US012668210B2

(12) United States Patent
Lee et al.

(10) Patent No.: US 12,668,210 B2
(45) Date of Patent: Jun. 30, 2026

(54) VEHICLE SENSOR CLEANING APPARATUS AND CONTROLLING METHOD OF THE SAME

(71) Applicants: DY AUTO CORPORATION, Asan-si (KR); DY-ESSYS CORP., Namdong-gu (KR)

(72) Inventors: Jong Wook Lee, Asan-si (KR); Sin Won Kang, Asan-si (KR); Min Wook Park, Namdong-gu (KR); Sun Ju Kim, Namdong-gu (KR); Tae Seong Roh, Namdong-gu (KR)

(73) Assignees: DY AUTO CORPORATION, Chungcheongnam-Do (KR); DY-ESSYS CORP., Incheon (KR)

( * ) Notice: Subject to any disclaimer, the term of this patent is extended or adjusted under 35 U.S.C. 154(b) by 0 days.

(21) Appl. No.: 18/733,164

(22) Filed: Jun. 4, 2024

(65) Prior Publication Data

US 2024/0409065 A1      Dec. 12, 2024

(30) Foreign Application Priority Data

Jun. 8, 2023      (KR) ........................ 10-2023-0073729

(51) Int. Cl.
*B60S 1/52* (2006.01)
*B60S 1/48* (2006.01)
(Continued)

(52) U.S. Cl.
CPC ................. *B60S 1/52* (2013.01); *B60S 1/481* (2013.01); *B60S 1/50* (2013.01); *B60S 1/54* (2013.01)

(58) Field of Classification Search
None
See application file for complete search history.

(56) References Cited

U.S. PATENT DOCUMENTS

2020/0114881 A1      4/2020   Yamauchi et al.
2022/0032879 A1      2/2022   Trebouet
2024/0140368 A1      5/2024   Lee et al.

FOREIGN PATENT DOCUMENTS

JP          2019018837          2/2019
JP          2022501257          1/2022
(Continued)

OTHER PUBLICATIONS

Google Patents translation of JP2019018837A (Year: 2025).*
(Continued)

*Primary Examiner* — Eric W Golightly
(74) *Attorney, Agent, or Firm* — Perman & Green, LLP

(57) ABSTRACT

Provided are a vehicle sensor cleaning apparatus and a controlling method of the vehicle sensor cleaning apparatus. The vehicle sensor cleaning apparatus includes at least one nozzle for spraying air and/or a washer fluid onto at least one sensor, at least one distributor for supplying the air and/or the washer fluid to at least one nozzle, and a spray controller for controlling a spray of a nozzle for each channel through an on/off control of a motor of the air tank and/or a motor of the washer fluid tank and an on/off control of the at least one distributor. The spray controller controls such that a time difference exists between an ON time of the motor of the air tank and/or the motor of the washer fluid tank and an ON time of the distributor.

9 Claims, 10 Drawing Sheets

(51) Int. Cl.
  _B60S 1/50_         (2006.01)
  _B60S 1/54_         (2006.01)

(56)              References Cited

FOREIGN PATENT DOCUMENTS

| KR | 19980019848 | 6/1998 |
| KR | 19980078682 | 11/1998 |
| KR | 20040026491 | 3/2004 |
| KR | 2531066 | 5/2023 |

OTHER PUBLICATIONS

Google Patents translation of KR102531066B1 (Year: 2025).*
Notice of Allowance dated Dec. 21, 2023 for KR 23-73729 6 pages.
Notice of Non-Final Rejection dated Aug. 7, 2023 for KR 23-73729 13 pages.

* cited by examiner

Figures 5, 6:
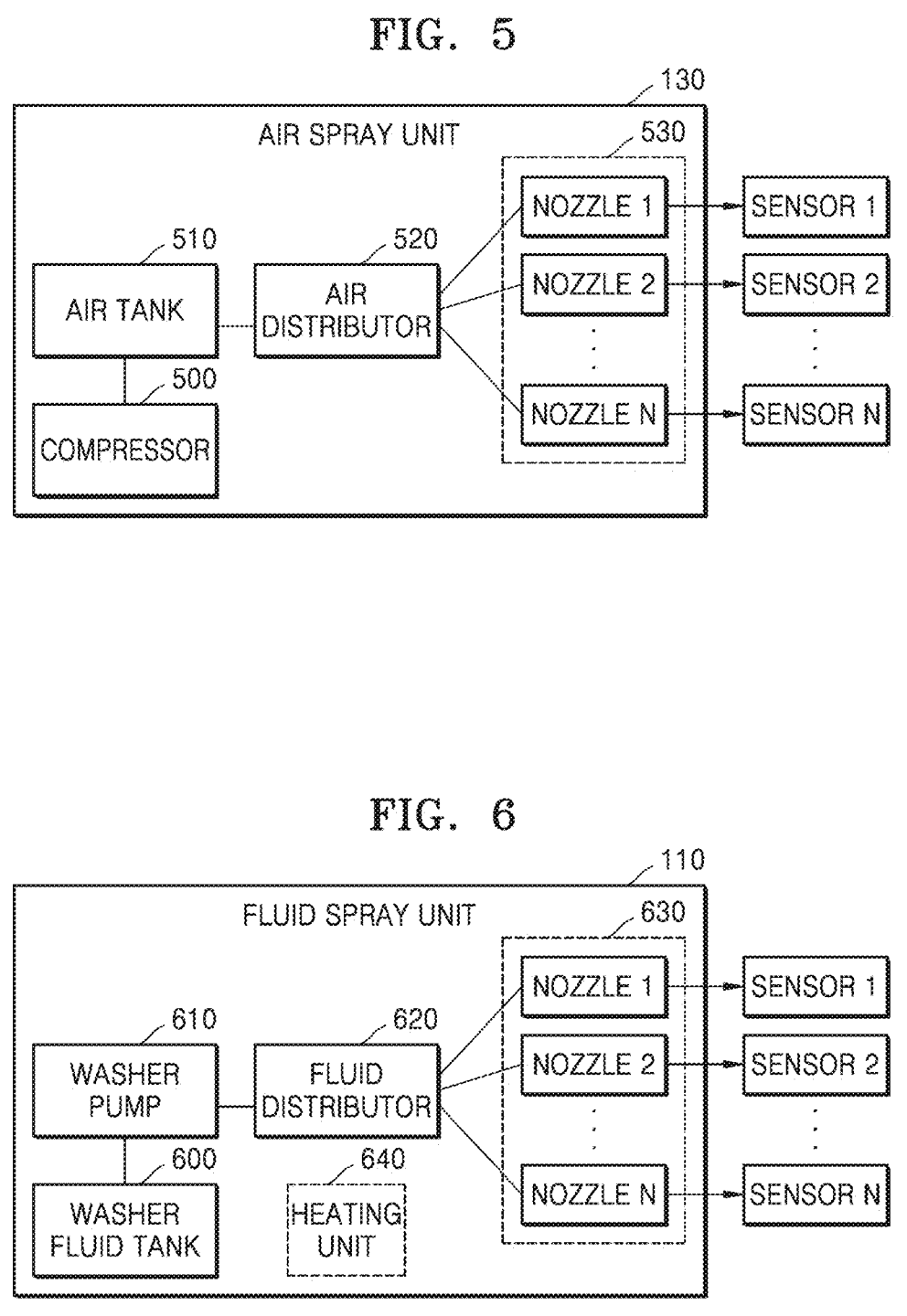

AIR SPRAY UNIT

530

510

AIR TANK

500

COMPRESSOR

520

AIR DISTRIBUTOR

NOZZLE 1 → SENSOR 1

NOZZLE 2 → SENSOR 2

⋮

NOZZLE N → SENSOR N

FLUID SPRAY UNIT

630

610

WASHER PUMP

600

WASHER FLUID TANK

620

FLUID DISTRIBUTOR

640

HEATING UNIT

NOZZLE 1 → SENSOR 1

NOZZLE 2 → SENSOR 2

⋮

NOZZLE N → SENSOR N

800  WASHER CLEANING REQUEST

810  AIR CLEANING REQUEST

820  WASHER SPRAY FUNCTION

830  AIR SPRAY FUNCTION

CHANNEL 1 : DELAY TIME 1

CHANNEL 2 : DELAY TIME 2

CHANNEL N : DELAY TIME N

START

TURN ON MOTOR AND TURN OFF DISTRIBUTOR — S1200

DELAY TIME PASSED? — S1210

NO

YES

TURN ON DISTRIBUTOR — S1220

END

VEHICLE SENSOR CLEANING APPARATUS AND CONTROLLING METHOD OF THE SAME

CROSS-REFERENCE TO RELATED APPLICATION

This application claims the benefit of Korean Patent Application No. 10-2023-0073729, filed on Jun. 8, 2023, in the Korean Intellectual Property Office, the disclosure of which is incorporated herein in its entirety by reference.

BACKGROUND

1. Field

The disclosure relates to a vehicle sensor cleaning apparatus for cleaning a sensor installed in a vehicle, and a controlling method of the vehicle sensor cleaning apparatus.

2. Description of the Related Art

Recently, vehicles are equipped with various types of sensors (a camera, a radar, a rider, etc.). When foreign materials adhere to the surface of a vehicle sensor, the sensor may not operate normally. When sensors required for autonomous driving or various driving assistance functions do not operate normally, the safety of the vehicle operation may be affected. Although a system that sprays a washer fluid to remove foreign materials from the windshield of a vehicle has been used, it is difficult to apply such a washer fluid spray system to clean sensors that are small in size and located in various parts of the vehicle. Furthermore, when multiple hoses are used to clean multiple sensors, a problem may occur as the strength of the spray output to each sensor differs depending on the length of each hose.

SUMMARY

Provided are a vehicle sensor cleaning apparatus capable of removing foreign materials adhering to a surface of a sensor mounted in a vehicle by maintaining a spray strength output to each sensor constant, and a controlling method of the vehicle sensor cleaning apparatus.

According to an aspect of the disclosure, an example of a vehicle sensor cleaning apparatus includes at least one nozzle configured to spray air and/or a washer fluid onto at least one sensor arranged in a vehicle, at least one distributor configured to supply the air from an air tank and/or the washer fluid from a washer fluid tank to the at least one nozzle, a spray controller configured to control a spray of a nozzle for each channel through an on/off control of a motor of the air tank and/or a motor of the washer fluid tank and an on/off control of the at least one distributor, wherein the spray controller is further configured to control such that a time difference exists between an ON time of the motor of the air tank and/or the motor of the washer fluid tank and an ON time of the distributor.

According to another aspect of the disclosure, an example of a controlling method of a vehicle sensor cleaning apparatus includes controlling a motor of an air tank and/or a motor of a washer fluid tank in an ON state, and performing sensor cleaning by controlling a channel in an ON state, the channel supplying air and/or a washer fluid to at least one sensor arranged in a vehicle, wherein a time difference exists between an ON time of the motor and an ON time of the channel.

BRIEF DESCRIPTION OF THE DRAWINGS

These and/or other aspects will become apparent and more readily appreciated from the following description of the embodiments, taken in conjunction with the accompanying drawings in which:

FIG. 5 is a block diagram showing a detailed configuration of an air spray unit according to an embodiment;

FIG. 6 is a block diagram showing a detailed configuration of a fluid spray unit according to an embodiment;

DETAILED DESCRIPTION

Figure 1:
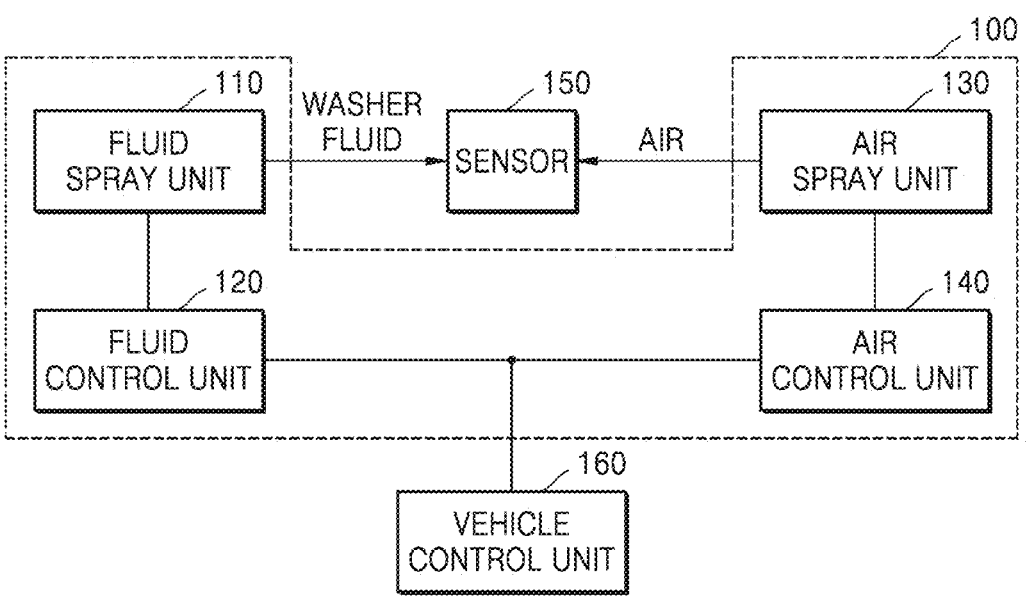
FIG. 1 is a block diagram showing an overall structure of a vehicle sensor cleaning apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a vehicle sensor cleaning apparatus and a controlling method of the vehicle sensor cleaning apparatus, according to an embodiment, are described in detail with reference to the accompanying drawings.

FIG. 1 is a block diagram showing an overall structure of a vehicle sensor cleaning apparatus 100 according to an embodiment.

Referring to FIG. 1, the vehicle sensor cleaning apparatus 100 may include a fluid spray unit 110, a fluid control unit 120, an air spray unit 130, and an air control unit 140. The vehicle sensor cleaning apparatus 100 may be connected to a vehicle control unit 160. In another embodiment, the vehicle sensor cleaning apparatus 100 may include a gateway (not shown) that transmits a cleaning request from the vehicle control unit 160 to each of the fluid control unit 120 and the air control unit 140. Each control unit may be implemented by a micro controller unit (MCU) and the like.

The fluid spray unit 110 sprays a washer fluid onto a sensor 150. The washer fluid may include various ingredients according to an embodiment. For example, the washer fluid may include various ingredient, such as general water, an ingredient same as the ingredient used for vehicle glass, and the like.

Figure 3:
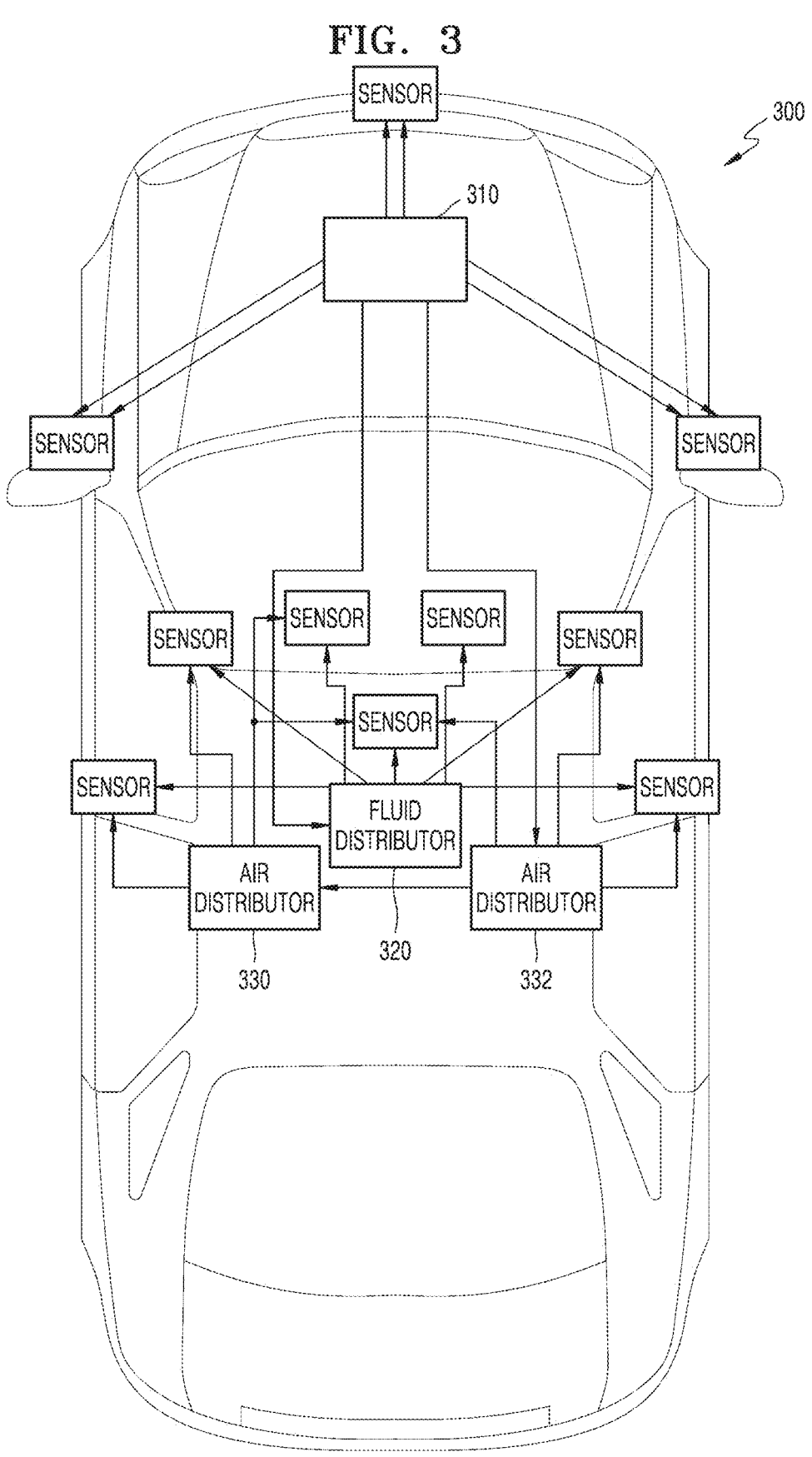
FIG. 3 is a diagram showing a vehicle equipped with a vehicle sensor cleaning apparatus according to an embodiment.

Although the present embodiment illustrates only one sensor 150, for convenience of explanation, a vehicle may be equipped with a plurality of sensors as illustrated in FIG. 3. The fluid spray unit 110 may simultaneously or sequentially spray a washer fluid onto a plurality of sensors or may spray a washer fluid only a sensor that requires cleaning, and an example of the configuration of the fluid spray unit 110 for such a purpose is illustrated in FIG. 6.

The fluid control unit 120 controls a washer fluid spray of the fluid spray unit 110. For example, when receiving a cleaning request from the vehicle control unit 160, the fluid control unit 120 controls the fluid spray unit 110 to spray a washer fluid onto the sensor 150. When there is a cleaning request signal for a plurality of sensors, the washer fluid spray may be performed sequentially or simultaneously.

The air spray unit 130 sprays air onto the sensor 150. As a vehicle includes a plurality of sensors, the air spray unit 130 may spray air simultaneously or sequentially onto the sensors or spray air only onto a sensor that requires cleaning. An example of the configuration of the air spray unit 130 is illustrated in FIG. 5. The air sprayed on to the sensor 150 may be general air or compressed air. FIG. 5 illustrates an example of spraying compressed air.

The air control unit 140 controls the air spray of the air spray unit 130. For example, when receiving a cleaning request from the vehicle control unit 160, the air control unit 140 control the air spray unit 130 to spray air onto the sensor 150.

When cleaning of the sensor 150 is needed, the vehicle control unit 160 outputs a cleaning request command. For example, the vehicle control unit 160 may identify a sensor needing cleaning through various methods according to the related art. As the method in which the vehicle control unit 160 identifies a sensor needing cleaning is out of the scope of the present invention, a description thereof is omitted. In the present embodiment, a case in which the fluid control unit 120 and the air control unit 140 receives a cleaning request signal including sensor identification information from the vehicle control unit 160 is described as an assumption.

The vehicle control unit 160 may output only a cleaning request command, not limiting a cleaning method. Accordingly, a method of cleaning each sensor according to a cleaning request may be implemented in various ways. The present embodiment proposes a method of cleaning through washer fluid spray and air spray when receiving a cleaning request from the vehicle control unit 160. The washer fluid spray and the air spray may be alternately performed so that sensor cleaning is efficiently performed. A method of controlling spray operations of the fluid spray unit 110 and the air spray unit 130 not to overlap each other is described with reference to FIGS. 7 and 8.

Figure 2:
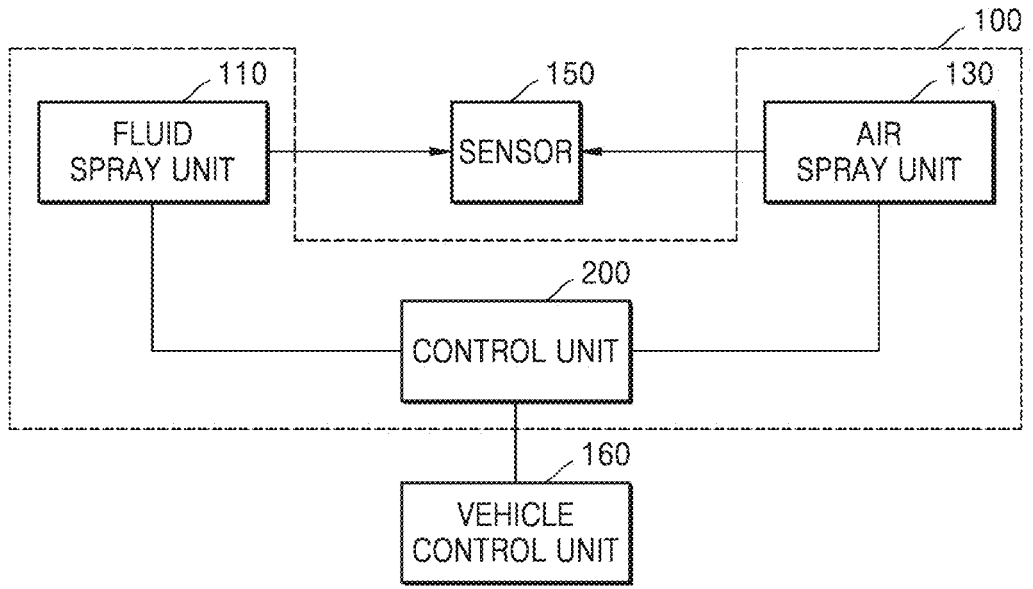
FIG. 2 is a block diagram showing a structure of a vehicle sensor cleaning apparatus according to another embodiment.

FIG. 2 is a block diagram showing a structure of a vehicle sensor cleaning apparatus 100 according to another embodiment.

Referring to FIG. 2, the vehicle sensor cleaning apparatus 100 may include the fluid spray unit 110, the air spray unit 130, and a control unit 200. The vehicle sensor cleaning apparatus 100 may be connected to the vehicle control unit 160. As the fluid spray unit 110, the air spray unit 130, the vehicle control unit 160, and the sensor 150 of the present embodiment are the same as those of FIG. 1, descriptions thereof are omitted.

The present embodiment includes the control unit 200 that incorporates the fluid control unit 120 and the air control unit 140 of FIG. 1 into one body. The control unit 200 may control the fluid spray unit 110 and the air spray unit 130 to spray a washer fluid and air simultaneously, or sequentially and alternately, when receiving a cleaning request from the vehicle control unit 160. The above-described configurations and functions of the fluid control unit 120 and the air control unit 140 may be integrally implemented in the control unit 200.

However, in the following description, for convenience of explanation, descriptions are based on the configuration of FIG. 1. Accordingly, the functions and configurations of the fluid control unit 120 and the air control unit 140 described below may be implemented by the control unit 200 of FIG. 2.

FIG. 3 is a diagram showing a vehicle 300 equipped with a vehicle sensor cleaning apparatus according to an embodiment.

Referring to FIG. 3, a plurality of sensors are provided in the vehicle 300. Some components of the fluid spray unit 110 and the air spray unit 130 (e.g., an air tank 510 of FIG. 5 and a washer fluid tank 600 of FIG. 6) may be provided in one side 310 of the vehicle 300. Although the present embodiment illustrates a case in which the air tank 510 and the washer fluid tank 600 are located in one place, this is an example and the air tank 510 and the washer fluid tank 600 may be located at different positions of the vehicle 300. In another embodiment, a plurality of air tanks and a plurality of washer fluid tanks may be provided.

Each sensor may include a nozzle to spray the air or the washer fluid. The air is sprayed onto the sensor through a nozzle 530 of FIG. 5, and the washer fluid is sprayed onto the sensor through a nozzle 630 of FIG. 6.

One or more air distributors 330 and 332 are provided to supply compressed air in the air tank 510 to each sensor through the nozzle 530. The air control unit 140 may spray the air onto a desired sensor through the control of the air distributors 330 and 332.

At least one fluid distributor 320 may be provided to supply the washer fluid in the washer fluid tank 600 to each sensor through the nozzle 630. The fluid control unit 120 may spray the washer fluid onto a desired sensor through the control of the fluid distributor 320.

Figure 4:
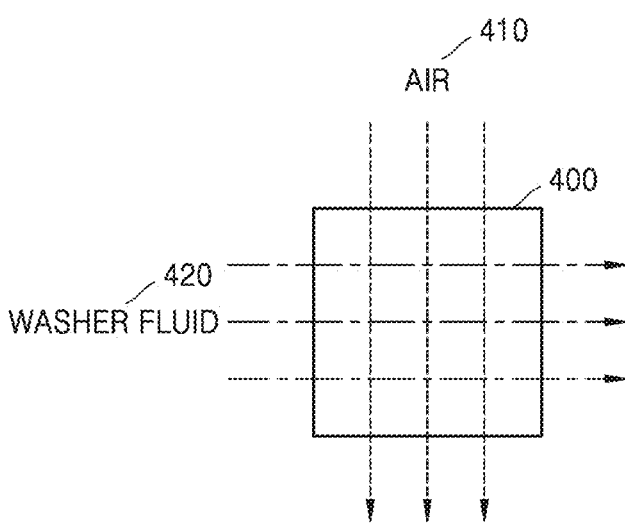
FIG. 4 illustrates an example of a cleaning direction of a sensor according to an embodiment.
Figure 4:
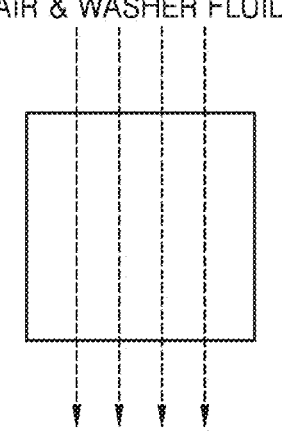
Figure 4:
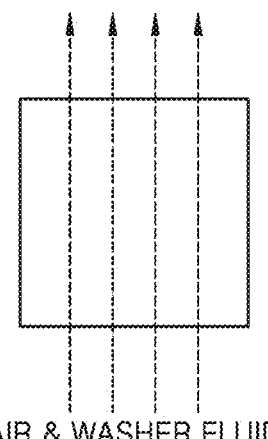

FIG. 4 illustrates an example of a cleaning direction of a sensor 400 according to an embodiment.

Referring to FIG. 4, a direction 420 of the washer fluid and a direction 410 of the air, which are sprayed onto a surface of the sensor 400, may be different directions. Furthermore, the washer fluid and the air may be simultaneously or sequentially sprayed, or only one of the washer fluid and the air may be sprayed. For example, the fluid spray unit 110 may spray the washer fluid onto the sensor 400 from left to right, whereas the air spray unit 130 may spray the air onto the sensor 400 from top to bottom. The foreign materials adhering to the surface of the sensor 400 may be effectively removed through the washer fluid and the air sprayed in different directions. For example, by spraying the air from top to bottom, the washer fluid, rainwater, or the like remaining on the surface of the sensor 400 may be removed.

In another embodiment, the direction 420 of the washer fluid and the direction 410 of the air, which are sprayed onto the surface of the sensor 400, may be the same direction. For example, the washer fluid and the air may be both sprayed from top to bottom (or from bottom to top) of the sensor 400. Through the simultaneous spray of the washer fluid and the air, a pressure applied to the sensor surface is increased so that foreign materials and the like on the surface may be effectively removed. In addition, the spray direction and spray order of the washer fluid and the air may be variously changed according to embodiments.

FIG. 5 is a block diagram showing a detailed configuration of the air spray unit 130 according to an embodiment.

Referring to FIG. 5, the air spray unit 130 may include a compressor 500, an air tank 510, an air distributor 520, and the nozzle 530. The nozzle 530 may include a plurality of nozzles.

The compressor 500 compresses the air and the compressed air is stored in the air tank 510. In an embodiment, the compressor 500 may include a plurality of motors. In this case, the compressor 500 uses the motors alternately so that load may be prevented from being applied to only a specific one of the motors. The compressor 500 may be implemented to include one motor. In another embodiment, the strength of compression of the air stored in the air tank 510 may be adjusted through the compressor 500.

The air tank 510 stores the compressed air. In an embodiment, the air may be sprayed onto the sensor by using a propeller or the like without the compressor 500 and the air tank 510. However, as the strength of air generated through a propeller or the like is weak, it is difficult to remove the foreign materials, water, and the like adhering on the surface of the sensor. Accordingly, according to the present embodiment, the strength (e.g., speed) of the air sprayed onto the sensor is increased using the compressed air stored in the air tank 510.

The air distributor 520 distributes the compressed air output from the air tank 510 to the nozzles 530. Each of the nozzles 530 is located in each sensor and sprays the air onto the sensor. As an example, the air distributor 520 may include a plurality of channels to output the compressed air, and each channel is connected to each of the nozzles 530 through an air hose. When there are more sensors than the number of channels of the air distributor 520, the air distributor 520 may include a plurality of air distributors. For example, the air distributors 520 may be connected in parallel to the air tank 510, or the air distributors 520 may be connected to each other in a hierarchical structure such as a tree structure.

The air distributor 520 performs turning on/off of each channel under the control of the air control unit 140. For example, when receiving an ON command of a first channel from the air control unit 140, the air distributor 520 outputs the compressed air of the air tank 510 through a first channel, and a first nozzle connected to the first channel through the air hose sprays the air onto a first sensor. The turning on/off of a channel may be controlled through a solenoid valve and the like.

The air control unit 140 may previously identify and store information about which sensor is connected to which channel of the air distributor 520, to control turning on/off of each channel of the air distributor 520. For example, when a relationship between first sensor identification information and the first channel is defined, the air control unit 140 may transmit an ON command of the first channel of the air distributor 520 to the air distributor 520 when cleaning of the first sensor is necessary.

FIG. 6 is a block diagram showing a detailed configuration of a fluid spray unit according to an embodiment.

Referring to FIG. 6, the fluid spray unit 110 may include a washer fluid tank 600, a washer pump 610, a fluid distributor 620, and the nozzle 630. The nozzle 630 may include a plurality of nozzles.

The washer fluid tank 600 stores the washer fluid. The washer pump 610 outputs the washer fluid stored in the washer fluid tank 600 to the fluid distributor 620. The fluid distributor 620 outputs the washer fluid received through the washer pump 610 to the nozzle 630. The washer pump 610 outputs the washer fluid through motor drive. The nozzle 630 sprays the washer fluid onto the sensor. Each of the nozzles 630 and the fluid distributor 620 are connected to each other through a fluid hose. In an embodiment, the nozzle 630 may be in the form of advancing when spraying the washer fluid onto the sensor and retracting after spray is completed.

In another embodiment, the washer pump 610 may include a plurality of washer pumps. For example, when there are twenty (20) nozzles, first to tenth nozzles may be connected to a first washer pump (or a first motor) via a first fluid distributor, eleventh to fourteenth nozzles may be connected to a second washer pump (or a second motor) via a second fluid distributor, and fifteenth to twentieth nozzles may be connected to a third washer pump (or a third motor) via a third fluid distributor. The fluid control unit 120 may control a plurality of washer pumps (or a plurality of motors) in parallel.

The fluid distributor 620 may select the nozzle 630 to output the washer fluid under the control of the fluid control unit 120. As an example, the fluid distributor 620 may include a plurality of channels to output the washer fluid, and each channel is connected to each of the nozzles 630 through a fluid hose. When the number of sensors are greater than the number of channels of the fluid distributor 620, the fluid distributor 620 may include a plurality of fluid distributors. For example, each of the fluid distributors 620 may be connected to the washer pump 610 in parallel, or the fluid distributors 620 may be connected to each other in a hierarchical structure such as a tree structure.

The fluid distributor 620 may spray the washer fluid onto a desired sensor by turning on/off a plurality of channels. When receiving an ON command of a first channel from the fluid control unit 120, the fluid distributor 620 outputs the washer fluid through the first channel, and the first nozzle connected to the first channel sprays the washer fluid onto the first sensor. The fluid control unit 120 may previously identify and store information about which sensor is connected to which channel of the fluid distributor 620, as in the air control unit 140 described above. For example, when a relationship between first sensor identification information and the first channel is previously defined, the fluid control unit 120 may transmit an ON command of the first channel of the fluid distributor 620 to the fluid distributor 620 when cleaning of the first sensor is necessary. In an embodiment, each channel connected to each nozzle may be controlled to be turned on/off through a solenoid valve.

In another embodiment, the fluid spray unit 110 may further include a heating unit 640. The heating unit 640 may supply heat to a fluid hose connecting the fluid distributor 620 to each of the nozzles 630, the washer pump 610, the washer fluid tank 600, the fluid distributor 620, or the like. For example, when an external temperature is low, for example, in the winter season, the washer fluid existing in the fluid hose or the fluid distributor 620 may be frozen, and thus, the washer fluid may be prevented from being frozen through the heating unit 640. In an embodiment, the fluid control unit 120 may operate the heating unit 640 when receiving an operation command of the heating unit 640 from the outside or the external temperature identified through a temperature sensor is less than a preset temperature.

Figure 7:
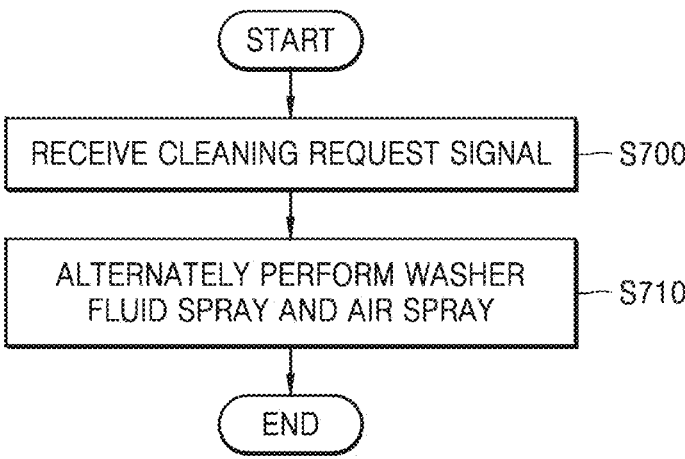
FIGS. 7 and 8 are diagrams showing an alternate controlling method of a vehicle sensor cleaning apparatus according to an embodiment.
Figure 8:
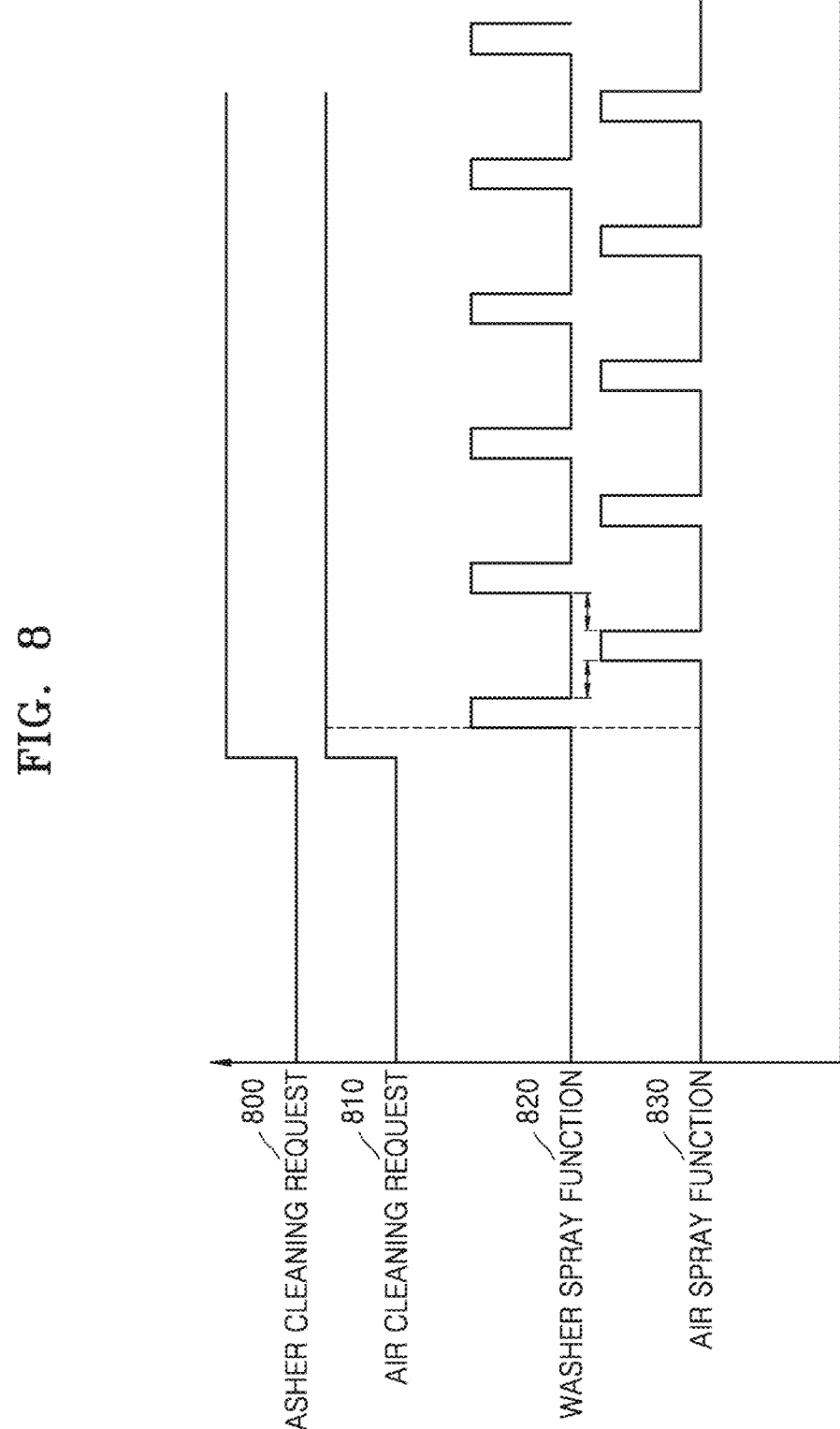

FIGS. 7 and 8 are diagrams showing an alternate controlling method of a vehicle sensor cleaning apparatus according to an embodiment.

Referring to FIGS. 7 and 8 together, the fluid control unit 120 and the air control unit 140 receive cleaning request signals 800 and 810 from the vehicle control unit 160 (S700). The fluid control unit 120 and the air control unit 140 may be connected to the vehicle control unit 160 through a controller area network (CAN) or CAN with a flexible data rate (CAN FD).

The fluid control unit 120 and the air control unit 140 may alternately spray the washer fluid and the air by differentiating a washer fluid spray control time of the fluid control unit 120 and an air spray control time of the air control unit 140 (S710). For example, the fluid control unit 120 and the air control unit 140 may control such that the washer fluid spray and the air spray are alternately performed for the same sensor.

The alternate control method for the same sensor may be implemented by various methods.

In an embodiment, when receiving a cleaning request signal (i.e., a washer cleaning request 800), the fluid control unit 120 is converted into a fluid spray mode of spraying the washer fluid onto a sensor corresponding to the cleaning request signal and informs the air control unit 140 of an ON state of the fluid spray mode. The fluid control unit 120 is connected to the air control unit 140, and when receiving the ON state of the fluid spray mode, the air control unit 140 does not perform air spray. When receiving the ON state of the fluid spray mode, if the air control unit 140 is in the middle of air spray, the air control unit 140 immediately stops the air spray. When checking an OFF state of the fluid spray mode through the fluid control unit 120, the air control unit 140 performs air spray according to a cleaning request signal (i.e., an air cleaning request 810). The air control unit 140 may receive the state of the fluid spray mode by requesting the state of the fluid spray mode from the fluid control unit 120 at regular intervals, or the fluid control unit 120 may transmit state information thereof to the air control unit 140 whenever the state of the fluid spray mode is changed. In addition, the fluid control unit 120 and the air control unit 140 may share the state of the fluid spray mode in various methods.

In another embodiment, when the washer cleaning request 800 and the air cleaning request 810 are simultaneously generated, the fluid control unit 120 outputs a control signal (that is, a washer spray function 820) for washer fluid spray immediately according to the washer cleaning request 800. When receiving the air cleaning request 810, the air control unit 140 outputs a control signal (that is, an air spray function 830) for air spray, after a predefined time passes. In other words, a certain time difference exists between a washer fluid spray operation start time and an air spray operation start time. For example, the fluid control unit 120 may control the fluid spray unit 110 to spray the washer fluid for a time t1 after receiving the washer cleaning request 800, and the air control unit 140 may control the air spray unit 130 to spray the air after the time t1 passes after receiving the air cleaning request 810.

In another embodiment, it may be controlled that the washer fluid spray and the air spray are alternately and repeatedly performed. The fluid control unit 120 repeats a washer fluid spray operation at regular intervals, and the air control unit 140 also repeats an air spray operation at regular intervals. For example, the fluid control unit 120 and the air control unit 140 each repeat the output of an ON signal for a spray operation at regular intervals. The washer fluid spray or air spray are performed in an ON signal section, whereas the washer fluid or air spray operation is not performed in an OFF signal section. When the washer fluid spray operation time and the air spray operation time are different from each other, the cycles of the two operations are the same, and the ON signal section of the washer fluid spray and the ON signal section of the air spray do not overlap each other, the washer spray operation and the air spray operation may be alternately performed without overlapping each other.

Figure 9:
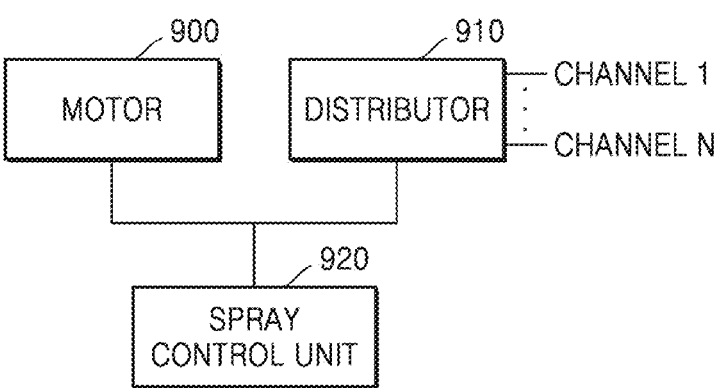
FIG. 9 is a block diagram of a spray controller for controlling a spray strength according to an embodiment.

FIG. 9 is a block diagram of a spray controller 920 for controlling spray strength according to an embodiment.

Referring to FIG. 9, the spray controller 920 controls a motor 900 and a distributor 910. The spray controller 920 may include the air control unit 140 or the fluid control unit 120 described above with reference to FIGS. 1 to 8. The motor 900 may include a motor of the compressor 500 that compresses air in the air tank 510 of the air spray unit 130, or a motor of the washer pump 610 that ejects the washer fluid in the washer fluid tank 600 of the fluid spray unit 110. The distributor 910 may include the air distributor 520 or the fluid distributor 620.

For example, when the present embodiment is applied to an air spray system, the spray controller 920 may be implemented by some components of the air control unit 140, the motor 900 may be the motor of the compressor 500, and the distributor 910 may be the air distributor 520. In another example, when the present embodiment is applied to a fluid spray system, the spray controller 920 may be implemented by some components of the fluid control unit 120, the motor 900 may be the motor of the washer pump 610, and the distributor 910 may be the fluid distributor 620.

The distributor 910 (an air distributor and/or a fluid distributor) is connected to a nozzle (the nozzle 530 and/or the nozzle 630) that spray air and/or washer fluid onto at least one sensor arranged in a vehicle. The distributor 910 controls, by using a valve, the turning on/off of a plurality of channels to which a plurality of nozzles are connected.

The spray controller 920 controls a spray of a nozzle for each channel through an on/off control of a motor of the air tank 510 and/or a motor of the washer fluid tank 600 and an on/off control of the distributor 910. The spray strength of the air or washer fluid output from each nozzle may vary depending on the hose length between the distributor 910 and each nozzle or the remaining amount of the washer fluid and the like left in the hose. To make the spray strength of each nozzle identical to each other, the spray controller 920 controls such that a time difference exists between the ON time of the motor of the air tank 510 and/or the motor of the washer fluid tank 600 and the ON time of the distributor 910. For example, as illustrated in FIG. 10, when a certain time passes after first driving the motor 900, the distributor 910 is controlled to be in an ON state.

In another embodiment, according to the type of a sensor, the optimal spray strength (i.e., an optimal pressure) of each nozzle may be different from each other. For example, the optimal spray strength of a nozzle for cleaning a LiDAR sensor may be 3 bars and the optimal spray strength of a nozzle for cleaning a camera may be 2 bars. In other words, a necessary spray strength (optimal pressure) for each nozzle may differ from one nozzle to another. In this case, for the optimal spray strength (optimal pressure) for each nozzle, the spray controller 920 may control such that a time difference exists between the ON time of the motor of the air tank 510 and/or the motor of the washer fluid tank 600 and the ON time of the distributor 910.

Figure 10:
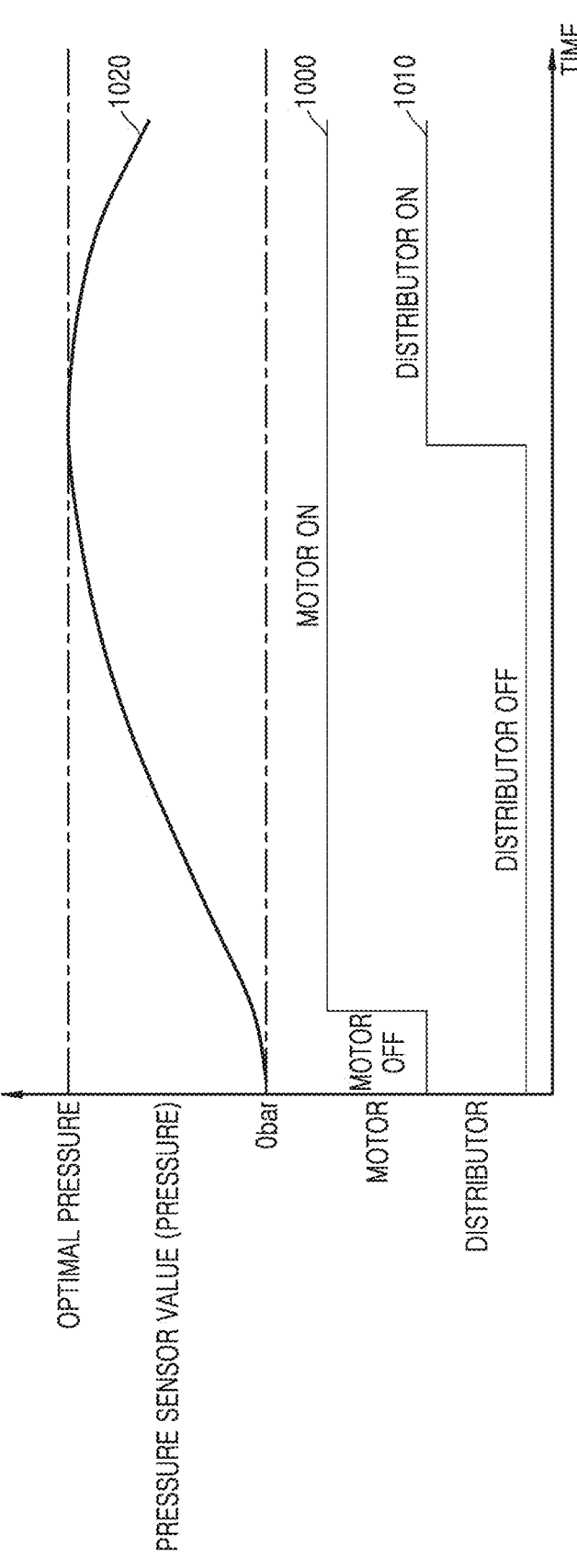
FIG. 10 is a diagram showing control signals of a motor and a distributor, according to an embodiment.

FIG. 10 is a diagram showing the control signals of a motor and a distributor, according to an embodiment.

Referring to FIG. 10, when receiving a cleaning request signal, the spray controller 920 identifies the distributor 910 connected to a nozzle corresponding to a sensor to be cleaned. The spray controller 920 outputs a motor-on-signal 1000 to drive the motor 900, and maintains the distributor 910 in an OFF state until a pressure 1020 of the distributor 910 reaches a predefined reference value (i.e., an optimal pressure). According to an embodiment, the predefined optimal pressure may be the same or different for each nozzle. When the pressure 1020 of the distributor 910 reaches the reference value (i.e., the optimal pressure of the corresponding nozzle), the spray controller 920 outputs a distributor-on-signal 1010 to convert the distributor 910 into an ON state, and controls the air and/or washer fluid to be sprayed through the nozzle.

The spray controller 920 may previously define a delay time (=motor ON start time–distributor ON start time) during which the distributor 910 is maintained in an OFF state after the motor 900 is driven. For example, the spray controller 920 may previously define a delay time for each distributor or a delay time for each channel. The delay time for each channel is described later with reference to FIG. 11.

In another embodiment, the spray controller 920 may convert the distributor 910 to an ON state when the pressure of the distributor 910 reaches the reference value, by measuring the pressure of the distributor 910 in real time. The pressure of the distributor 910 may be measured in various methods according to the related art such as a pressure sensor and the like. When the pressure of the distributor 910 is measured in real time, accurate spray strength for each channel may be controlled. This will be described again with reference to FIG. 13.

Figures 11, 12:
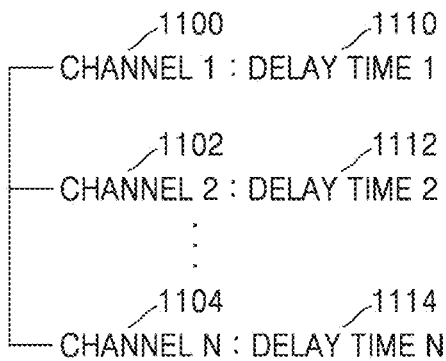
FIG. 11 illustrates an example of a delay time for each channel, according to an embodiment.
FIG. 12 is a flowchart showing a spray control method according to an embodiment.

FIG. 11 illustrates an example of a delay time for each channel, according to an embodiment.

Referring to FIG. 11, the spray controller 920 may previously define first, second, . . . to N-th delay times 1110, 1112, . . . to 1114 for the respective channels considering the hose length of each of a plurality of channels, a predefined reference strength (optimal pressure) for each channel (nozzle), and/or the like. For example, after defining a reference delay time for a hose having a predefined reference length, the first, second, . . . to N-th delay times 1110, 1112, . . . to 1114 of the respective channel may be defined to be "reference delay time±a" according to a difference between the hose length of each of first, second, . . . to N-th channels 1100, 1102, . . . to 1104 and the reference length.

When a plurality of the first, second, . . . to N-th channels 1100, 1102, . . . to 1104 exist in the distributor 910 and the hose lengths for the respective channels are different from each other, optimal delay times for the respective channels may be different from each other. Alternatively, a plurality of the first, second, . . . to N-th channels 1100, 1102, . . . to 1104 exist in the distributor 910, and the optimal delay times may be different from each other according to the types of the sensor to be cleaned of the respective channels. The spray controller 920 may control the motor 900 and the distributor 910 by identifying the delay time of a channel corresponding to a sensor to be cleaned.

In an embodiment, when the delay times of a plurality of channels connected to the distributor 910 are different from each other, and the channels connected to the distributor 910 require air or washer fluid spray, the spray controller 920 may maintain the distributor 910 in an OFF state for the longest delay time among the first, second, . . . to N-th delay times 1110, 1112, . . . to 1114 of the channels. Alternatively, the spray controller 920 may maintain the distributor 910 in an OFF state for an average delay time or for the shortest delay time among the first, second, . . . to N-th delay times 1110, 1112, . . . to 1114 of the channels.

FIG. 12 is a flowchart showing a spray control method according to an embodiment.

Referring to FIG. 12, when receiving a cleaning request signal, the spray controller 920 identifies the distributor 910 of a channel corresponding to a sensor to be cleaned and then drives the motor 900, and the distributor 910 maintains an OFF state (S1200). The spray controller 920 identifies a delay time predefined in a channel by a method of FIG. 11, and then, when the delay time passes (S1210), converts the distributor 910 into an ON state (S1220).

Figure 13:
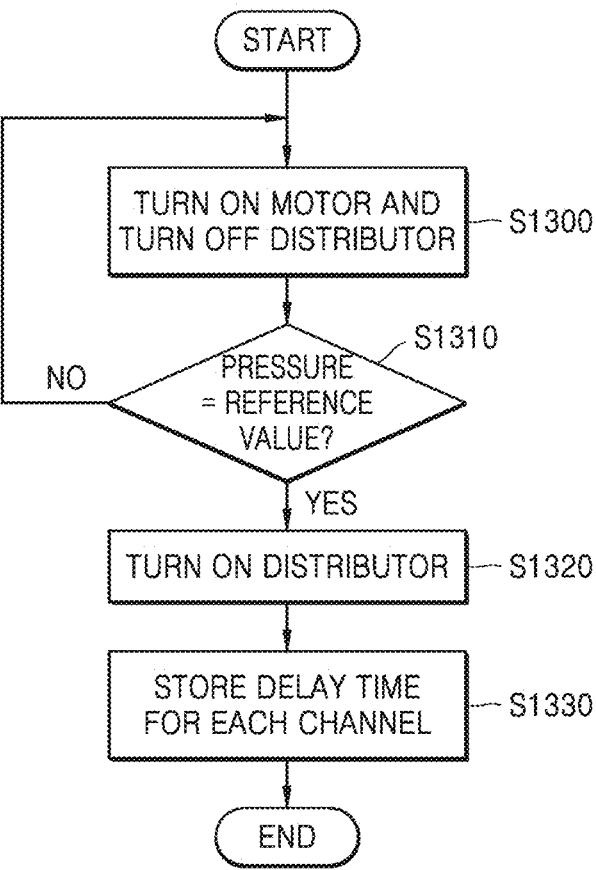
FIG. 13 is a flowchart showing a spray control method according to another embodiment.

FIG. 13 is a flowchart showing a spray control method according to another embodiment.

Referring to FIG. 13, when receiving a cleaning request signal, the spray controller 920 identifies a distributor of a channel corresponding to a sensor to be cleaned and then drives the motor 900, and the distributor 910 maintains an OFF state (S1300). When the pressure value of the distributor 910 reaches a predefined reference value (S1310), the spray controller 920 converts the distributor 910 into an ON state.

In another embodiment, the spray controller 920 may identify a delay time for each channel by the method FIG. 13 and store the delay time for each channel (S1330). For example, when spray through a first channel is necessary, the spray controller 920 identifies and stores a time (i.e., a delay time of the first channel) from driving the motor 900 driving until the pressure of the distributor 910 connected to the first channel reaches a reference value. The delay time for each channel of FIG. 11 may be identified and sored by such a method.

When information about the delay time for each channel is all identified and stored, the spray controller 920 may control spray strength through the method of FIG. 12. In another embodiment, after identifying a delay time multiple times for the same channel through the method of FIG. 13, the spray controller 920 may store an average delay time as a delay time for each channel. For example, as the delay time identified one time for the first channel may vary depending on an external environment, spray control is performed for the first channel by the method of FIG. 13 and information about the multiple delay times is stored and then an average value thereof may be stored and managed as a delay time of the first channel. In another embodiment, an average of a certain number of previously obtained delay times based on the current time may be stored and managed as a delay time of the corresponding channel. In this case, a change in the delay time according to a change in the external environment such as a seasonal factor and the like may be reflected.

The disclosure may also be implemented as program code to be read by a computer in a computer-readable recording medium. The computer-readable recording medium includes any type of recording apparatus that stores data that can be read by a computer system. Examples of the computer-readable recording medium includes read only memory (ROM), random access memory (RAM), compact disc ROM (CD-ROM), magnetic tapes, floppy discs, optical data storage devices, and the like. Furthermore, the computer readable recording medium can also be distributed over network coupled computer systems so that the computer readable code is stored and executed in a distributive manner.

According to the embodiments of the disclosure, even when the length of a hose of each channel differs, the spray strength of air and/or a washer fluid output to a sensor may be maintained constant. In another embodiment, foreign materials adhering on a surface of a sensor may be cleanly removed by using a washer fluid and air together.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vehicle sensor cleaning apparatus comprising:
a plurality of nozzles configured to spray air and/or a washer fluid onto a plurality of sensors arranged in a vehicle;
at least one distributor configured to supply the air from an air tank and/or the washer fluid from a washer fluid tank to the plurality of nozzles, the at least one distributor including a plurality of channels, each channel connected to a respective nozzle; and
a spray controller configured to control a spray of a nozzle for each channel through an on/off control of a motor of the air tank and/or a motor of the washer fluid tank and an on/off control of the at least one distributor,
wherein the spray controller is further configured to control such that a time difference exists between an ON time of the motor of the air tank and/or the motor of the washer fluid tank and an ON time of the distributor, and the spray controller is configured to identify a delay time, which represents the time difference between the ON time of the motor and the ON time of the distributor and is defined for each channel based on hose length between the distributor and each nozzle, of the channel to which the nozzle corresponding to the sensor to be cleaned is connected, using predefined delay time for each channel, controls the motor in an ON state, and after the delay time of the corresponding channel passes, controls the distributor in an ON state.

2. The vehicle sensor cleaning apparatus of claim 1, wherein the delay time defined for each channel is defined as a +/−value according to an optimal pressure value predefined for each channel or a length of a hose for each channel based on a reference delay time.

3. The vehicle sensor cleaning apparatus of claim 1, wherein the spray controller is further configured to control the motor in the ON state and the distributor in an OFF state, identify a time for a pressure value of the distributor or a pressure value of the air tank or the washer fluid tank to reach a predefined reference value, and define the delay time for each channel.

4. The vehicle sensor cleaning apparatus of claim 1, wherein the spray controller is further configured to control the motor in the ON state, maintain the distributor in an OFF state until a pressure value of the distributor or a pressure value of the air tank or the washer fluid tank reaches a predefined reference value, and when the pressure value reaches the reference value, control the distributor in the ON state.

5. The vehicle sensor cleaning apparatus of claim 4, wherein the spray controller is further configured to control the motor in the ON state and store for each channel the delay time until the distributor becomes the ON state.

6. A controlling method of a vehicle sensor cleaning apparatus, the controlling method comprising:
providing the vehicle sensor cleaning apparatus as set forth in claim 1 a step of controlling the motor of the air tank and/or the motor of the washer fluid tank in the ON state; and
a step of performing sensor cleaning by controlling at least one of the plurality of channels in the ON state, the at least one of the plurality of channels supplying the air and/or the washer fluid to at least one of the plurality of sensors arranged in the vehicle.

7. The controlling method of claim 6, further comprising defining the delay time defined for each channel by applying a +/−value according to a length of a hose for each channel based on a reference delay time.

8. The controlling method of claim 6, further comprising controlling the motor in the ON state and the distributor in an OFF state and defining and storing a time for a pressure value of the distributor or a pressure value of the air tank or the washer fluid tank to reach a predefined reference value, as the delay time for each channel.

9. The controlling method of claim 6, wherein the performing of the sensor cleaning comprises controlling the motor in the ON state, maintaining the distributor in an OFF state until a pressure value of the distributor or a pressure value of the air tank or the washer fluid tank reaches a predefined reference value, and when the pressure value reaches the reference value, controlling the distributor in the ON state.

* * * * *